(12) United States Patent
Natroshvili et al.

(10) Patent No.: US 10,733,697 B2
(45) Date of Patent: Aug. 4, 2020

(54) CONVOLUTIONAL NEURAL NETWORK FOR WIDE-ANGLE CAMERA IMAGES

(71) Applicant: Intel IP Corporation, Santa Clara, CA (US)

(72) Inventors: Koba Natroshvili, Waldbronn (DE); Kay-Ulrich Scholl, Karlsbad (DE)

(73) Assignee: Intel IP Corporation, Santa Clara, CA (US)

( * ) Notice: Subject to any disclaimer, the term of this patent is extended or adjusted under 35 U.S.C. 154(b) by 158 days.

(21) Appl. No.: 15/391,149

(22) Filed: Dec. 27, 2016

(65) Prior Publication Data

US 2018/0182083 A1 Jun. 28, 2018

(51) Int. Cl.
| | |
|---|---|
| *G06K 9/62* | (2006.01) |
| *G06K 9/46* | (2006.01) |
| *G06K 9/20* | (2006.01) |
| *G06T 3/00* | (2006.01) |
| *G06N 3/04* | (2006.01) |

(52) U.S. Cl.
CPC ............ *G06T 3/0062* (2013.01); *G06K 9/209* (2013.01); *G06K 9/4628* (2013.01); *G06K 9/627* (2013.01); *G06N 3/0454* (2013.01)

(58) Field of Classification Search
None
See application file for complete search history.

(56) References Cited

U.S. PATENT DOCUMENTS

| | | | |
|---|---|---|---|
| 9,437,001 | B2 | 9/2016 | Scholl et al. |
| 2015/0178884 | A1* | 6/2015 | Scholl ................. G06T 3/0018 348/36 |
| 2016/0080699 | A1 | 3/2016 | Scholl et al. |
| 2016/0284087 | A1 | 9/2016 | Natroshvili et al. |
| 2017/0297488 | A1* | 10/2017 | Wang ..................... B60R 1/00 |
| 2019/0026956 | A1* | 1/2019 | Gausebeck .......... H04N 13/246 |

OTHER PUBLICATIONS

Scaramuzza, Davide, et al.; "A Flexible Technique for Accurate Omnidirectional Camera Calibration and Structure From Motion"; Proceeding of the Fourth IEEE International Conference on Computer Vision Systems, (ICVS 2006), date of conference Jan. 4-7, 2006, date added to IEEE Xplore Mar. 2006, 8 pages.

Shimizu, Seiya, et al.; "Wraparound View System for Motor Vehicles", Fujitsu Science Technological Journal, vol. 46, No. 1, Jan. 2010, 8 pages.

Steinkraus, Dave, et al.; "Using GPU's Machine Learning Algorithms", Eighth International Conference on Document Analysis and Recognition (ICDAR'05), date of conference Aug. 31-Sep. 1, 2005, dated added to IEEE Xplore Jan. 2006, 6 pages.

* cited by examiner

*Primary Examiner* — Randolph I Chu
(74) *Attorney, Agent, or Firm* — International IP Law Group, P.L.L.C.

(57) ABSTRACT

An apparatus for applying a convolutional neural network (CNN) to a wide-angle camera image is described herein. The apparatus includes a camera, controller, convolution mechanism and a fully connected layer. The camera is to capture a wide-angle image, and the controller is to map the image on a 3D surface. The convolution mechanism is to perform convolution on the 3D surface and the fully connected layer is to classify a plurality of features generated by the convolution mechanism.

25 Claims, 11 Drawing Sheets

300

700

800

CONVOLUTIONAL NEURAL NETWORK FOR WIDE-ANGLE CAMERA IMAGES

BACKGROUND ART

Environment perception and recognition can be realized via deep learning and Convolutional Neural Networks (CNN). The perception and recognition can include capturing views of the surrounding environment and classifying objects in the views. Wide-angle cameras can increase the captured field-of-view, however these cameras produce a "fisheye" effect. The fisheye effect results in a distorted image, where the distortion is dependent on a distance from the camera center. Objects closer to the camera center appear normal, while objects farther from the camera center are distorted with a convex non-rectilinear appearance. This distortion can prevent deep learning and CNNs from accurately perceiving, recognizing, and classifying the surrounding environment.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE ASPECTS

Figure 1:
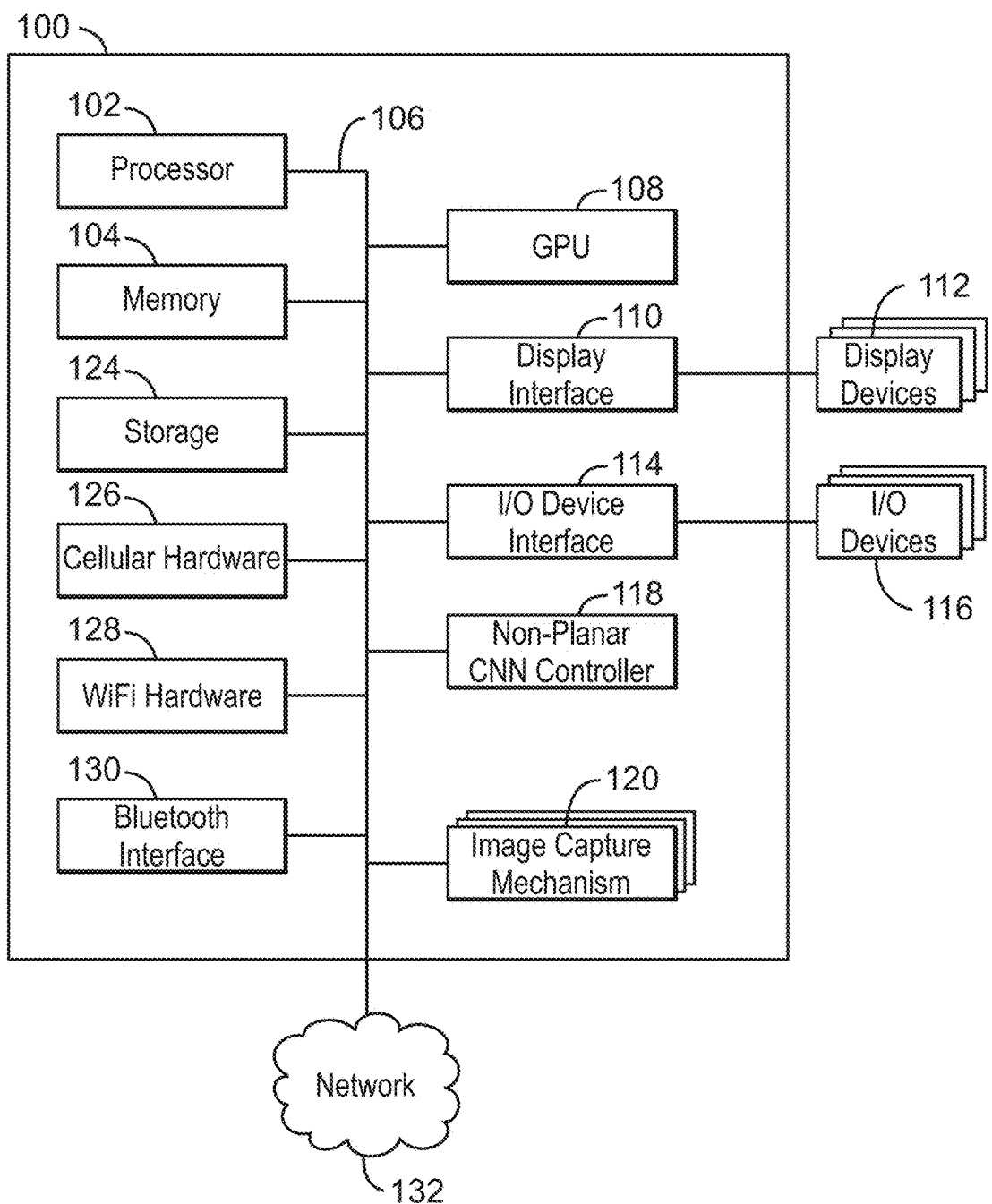
FIG. 1 is a block diagram of an electronic device for applying a convolutional neural network (CNN) to a wide-angle camera image.

Objects in a fisheye camera are subject to a severe distortion. For example, the larger the distance to the camera's center, the more distorted objects appear in the image. When objects appear with varying distortions depending on the distance to the camera center, large interclass variation occurs in the CNN and the classification results are degraded. In deep learning, classification includes identifying the categories to which an observation belongs. Often, classification of the images from wide-angle cameras directly. Without any further pre-processing these images can degrade the accuracy of the classification Embodiments described herein apply a convolutional neural network (CNN) to a wide-angle camera image. In embodiments, the CNN that relies on wide-angle camera images includes an additional layer such as mapping the image onto a 3D surface, and applying a spherical harmonic to the mapped image for convolution. Mapping the image onto a 3D surface is performed using the wide-angle camera's intrinsic calibration values. In embodiments, the convolution of the first level of the CNN is performed by convolution on a 3D surface instead of on a standard plane input image. The present techniques also enable the convolution using the 3D surface to be linear and shift invariant. In some embodiments, the wide-angle camera is described as a fisheye camera. However, the present techniques may use any wide-angle camera, and can apply to any image with distortion as a function of distance from a point the in camera's field-of-view.

Some embodiments may be implemented in one or a combination of hardware, firmware, and software. Further, some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

FIG. 1 is a block diagram of an electronic device for applying a convolutional neural network (CNN) to a wide-angle camera image. The electronic device 100 may be, for example, a laptop computer, tablet computer, mobile phone, smart phone, or a wearable device, among others. The electronic device 100 may include a central processing unit (CPU) 102 that is configured to execute stored instructions, as well as a memory device 104 that stores instructions that are executable by the CPU 102. The CPU may be coupled to the memory device 104 by a bus 106. Additionally, the CPU 102 can be a single core processor, a multi-core processor, a computing cluster, or any number of other configurations. Furthermore, the electronic device 100 may include more than one CPU 102. The memory device 104 can include random access memory (RAM), read only memory (ROM), flash memory, or any other suitable memory systems. For example, the memory device 104 may include dynamic random access memory (DRAM).

The electronic device 100 also includes a graphics processing unit (GPU) 108. As shown, the CPU 102 can be coupled through the bus 106 to the GPU 108. The GPU 108 can be configured to perform any number of graphics operations within the electronic device 100. For example, the GPU 108 can be configured to render or manipulate graphics images, graphics frames, videos, or the like, to be displayed to a user of the electronic device 100. In some embodiments, the GPU 108 includes a number of graphics engines, wherein each graphics engine is configured to perform specific graphics tasks, or to execute specific types of workloads. For example, the GPU 108 may include an engine that processes data from the image capture mechanism 120.

The CPU 102 can be linked through the bus 106 to a display interface 110 configured to connect the electronic device 100 to a display device 112. The display device 112 can include a display screen that is a built-in component of the electronic device 100. The display device 112 can also include a computer monitor, television, or projector, among others, that is externally connected to the electronic device 100.

The CPU 102 can also be connected through the bus 106 to an input/output (I/O) device interface 114 configured to connect the electronic device 100 to one or more I/O devices 116. The I/O devices 116 can include, for example, a keyboard and a pointing device, wherein the pointing device can include a touchpad or a touchscreen, among others. The I/O devices 116 can be built-in components of the electronic device 100, or can be devices that are externally connected to the electronic device 100.

The electronic device 100 also includes a non-planar CNN controller 118. The non-planar CNN controller may include a combination of hardware and software that is to perceive, recognize, and classify the surrounding environment as captured by the plurality of image capture mechanisms 120. Accordingly, the electronic device 100 may include a plurality of image capture mechanisms, including but not limited to a wide-angle camera. In embodiments, the wide-angle images may be captured by a wide-angle image sensor. The wide-angle camera or sensors may include automotive imaging sensors.

The electronic device may also include a storage device 124. The storage device 124 is a physical memory such as a hard drive, an optical drive, a flash drive, an array of drives, or any combinations thereof. The storage device 124 can store user data, such as audio files, video files, audio/video files, and picture files, among others. The storage device 124 can also store programming code such as device drivers, software applications, operating systems, and the like. The programming code stored to the storage device 124 may be executed by the CPU 102, GPU 108, or any other processors that may be included in the electronic device 100.

The CPU 102 may be linked through the bus 106 to cellular hardware 126. The cellular hardware 126 may be any cellular technology, for example, the 4G standard (International Mobile Telecommunications-Advanced (IMT-Advanced) Standard promulgated by the International Telecommunications Union-Radio communication Sector (ITU-R)). In this manner, the electronic device 100 may access any network 132 without being tethered or paired to another device, where the network 132 is a cellular network.

The CPU 102 may also be linked through the bus 106 to WiFi hardware 128. The WiFi hardware is hardware according to WiFi standards (standards promulgated as Institute of Electrical and Electronics Engineers' (IEEE) 802.11 standards). The WiFi hardware 128 enables the electronic device 100 to connect to the Internet using the Transmission Control Protocol and the Internet Protocol (TCP/IP), where the network 132 is the Internet. Accordingly, the electronic device 100 can enable end-to-end connectivity with the Internet by addressing, routing, transmitting, and receiving data according to the TCP/IP protocol without the use of another device. Additionally, a Bluetooth Interface 130 may be coupled to the CPU 102 through the bus 106. The Bluetooth Interface 130 is an interface according to Bluetooth networks (based on the Bluetooth standard promulgated by the Bluetooth Special Interest Group). The Bluetooth Interface 130 enables the electronic device 100 to be paired with other Bluetooth enabled devices through a personal area network (PAN). Accordingly, the network 132 may be a PAN. Examples of Bluetooth enabled devices include a laptop computer, desktop computer, ultrabook, tablet computer, mobile device, or server, among others. While one network is illustrated, the electronic device 100 can connect with a plurality of networks simultaneously.

The block diagram of FIG. 1 is not intended to indicate that the electronic device 100 is to include all of the components shown in FIG. 1. Rather, the computing system 100 can include fewer or additional components not illustrated in FIG. 1 (e.g., sensors, power management integrated circuits, additional network interfaces, etc.). The electronic device 100 may include any number of additional components not shown in FIG. 1, depending on the details of the specific implementation. Furthermore, any of the functionalities of the CPU 102 may be partially, or entirely, implemented in hardware and/or in a processor. For example, the functionality may be implemented with an application specific integrated circuit, in logic implemented in a processor, in logic implemented in a specialized graphics processing unit, or in any other device.

Often distortion problems in wide-angle camera images are solved by unwrapping the image onto a plurality of planes. Several planes are required in such a scenario. The complete image is typically divided into several regions that are undistorted to the plane. The resulting features on the several planes would become non-continuous, which can cause issues for various applications that rely on a continuous image and feature map from a CNN. Accordingly, the present techniques maintain a single, non-planar canvas to unwrap the wide-angle image for CNN processing. As used herein, a non-planar canvas refers to a three-dimensional (3D) canvas.

Figure 2A:
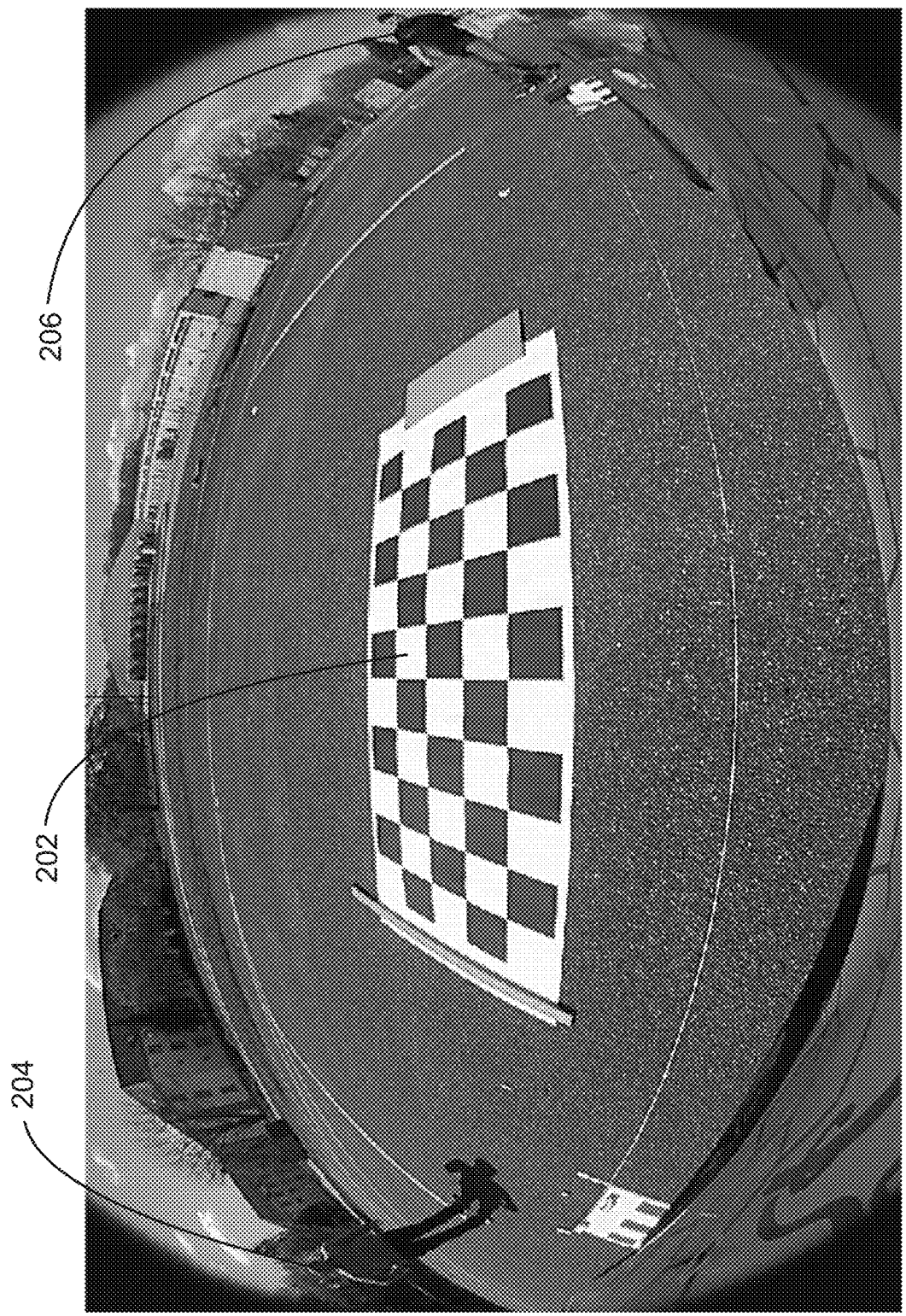
FIG. 2A is an illustration of a fisheye image.
Figure 2B:
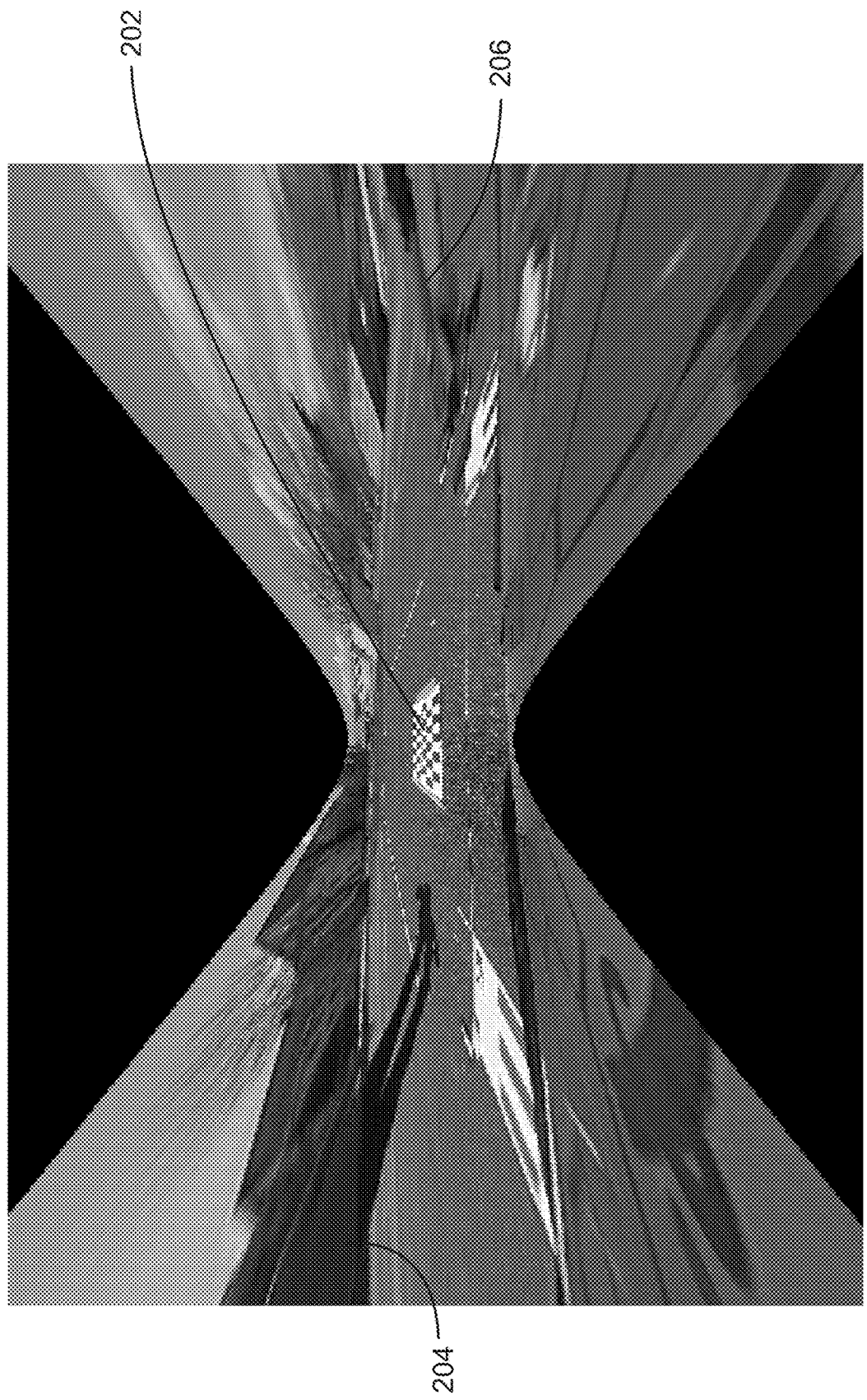
FIG. 2B is an illustration of an unwrapped fisheye image.

FIG. 2A is an illustration of a fisheye image 200A. The fisheye image 200 includes objects such as a checkerboard 202, a person 204, and a person 206. To apply a CNN to the fisheye image 200A, the image can be unwrapped into a planar image, such as in FIG. 2B. FIG. 2B is an illustration of an unwrapped fisheye image 200B. Note the checkerboard 202 appears somewhat appropriately, while the person 204 and the person 206 are each heavily distorted. In some cases, to apply the CNN on fisheye images includes undistorting the image to obtain the image in FIG. 2B. The undistorted image has had distortions removed, and can be further processed by a CNN like a conventional perspective image. However, the strong perspective distortion that remains in image 200B degrades any CNN results.

The images 200A and 200B illustrate that persons 204 and 206 standing in the image corners are strongly distorted. This strong perspective distortion makes any deep learning approaches to objects that are not near to the center of the image unlikely. It would be possible to divide the image in many parts (one image per node) and undistort each part of the image. The end result is in multiple images (even one image per input node in the CNN). Such a result is undesirable as in some tasks of deep learning algorithms the complete image is considered as single entity. For example, applying a CNN to an input image for pixel wise segmentation uses an image that is a single entity. The present techniques use a camera and lens model to create a plane that eliminates the distortion in the input layer of a CNN without dividing the image into multiple regions.

Figure 3:
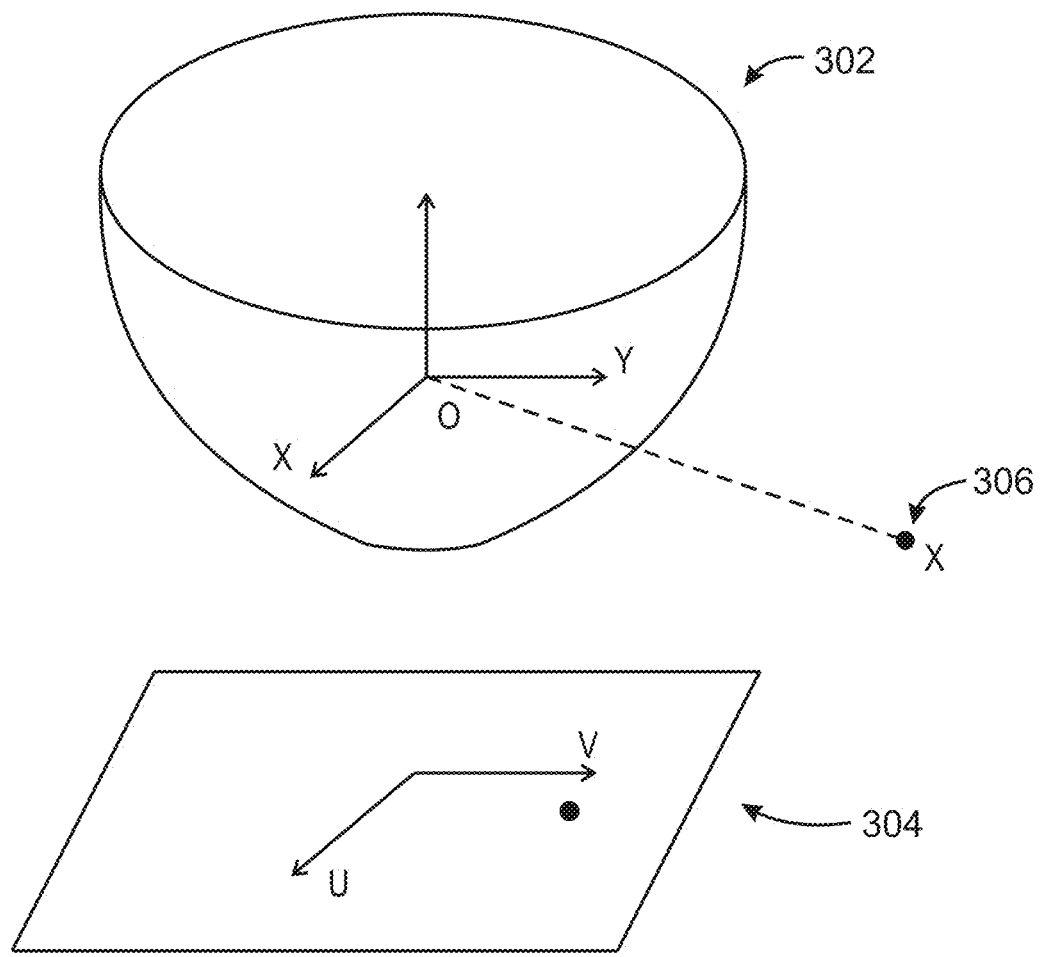
FIG. 3 is an omni-directional camera model.

FIG. 3 is an omni-directional camera model 300. In the camera model 300, a real-world coordinate space 302 is projected onto the plane (u, v) 304. There are several different fisheye projection models available. Further, a wide-angle camera can have other types of distortions that are added to the lenses during camera manufacture. Fisheye cameras may be calibrated by a polynomial approximation. The polynomial can model the fisheye function by using a polynomial of a high degree. In embodiments, the polynomial model approximates all types of distortions together in a single function.

The point X at reference number 306 from the world coordinates 302 is projected on the plane (u, v) 304. For the projection, the following relation is valid:

$$P * X = \lambda \begin{bmatrix} Au + t \\ f(u, v) \end{bmatrix}$$ Eqn. 1 where P is the projection matrix, u is the projection into fisheye image (u,v), λ is a factor corresponding to the homogenous ambiguity, and A, t are the factors corresponding to the misalignment (camera construction, resolution, pixel size, etc.). In embodiments, Eqn. 1 is valid for any λ, where homogenous ambiguity maintains that perspective geometry all points lying on a line will be projected onto a single point.

The function describing the model may be written as follows:

$$f(u,v) = a_0 + a_1\rho + a_2\rho^2 + \ldots + a_n\rho^n$$ Eqn. 2 where ρ is the metric distance of point (u, v) to the optical axis.

The intrinsic parameters of the modeling are: $a_0$, $a_1$, $a_2$, ..., $a_n$ as polynomial coefficients, camera, $x_c$, $y_c$ are camera centers, and c, d, e are parameters which take into account the camera resolution in the different directions. In embodiments, after calibration of the camera the intrinsic parameters are estimated. For each camera, the intrinsic parameters vary based on the specific configuration of the camera. In embodiments, the intrinsic parameters are based on the type of camera, distortions inherent in the lenses of the camera, and other camera specific values.

The intrinsic parameters are assumed to be known. The projection of any 3D point on the fisheye image can be calculated as follows:

$$u = u'c + v*d + x_c, v = u'c + v + y_c$$ Eqn. 3 where $$u' = \frac{x}{\sqrt{x^2 + y^2}}\rho, v' = \frac{y}{\sqrt{x^2 + y^2}}\rho$$ Eqn. 4

With Eqn. 3, a wide-angle camera image can be mapped onto any 3D surface based on its intrinsic camera parameters.

Figure 4:
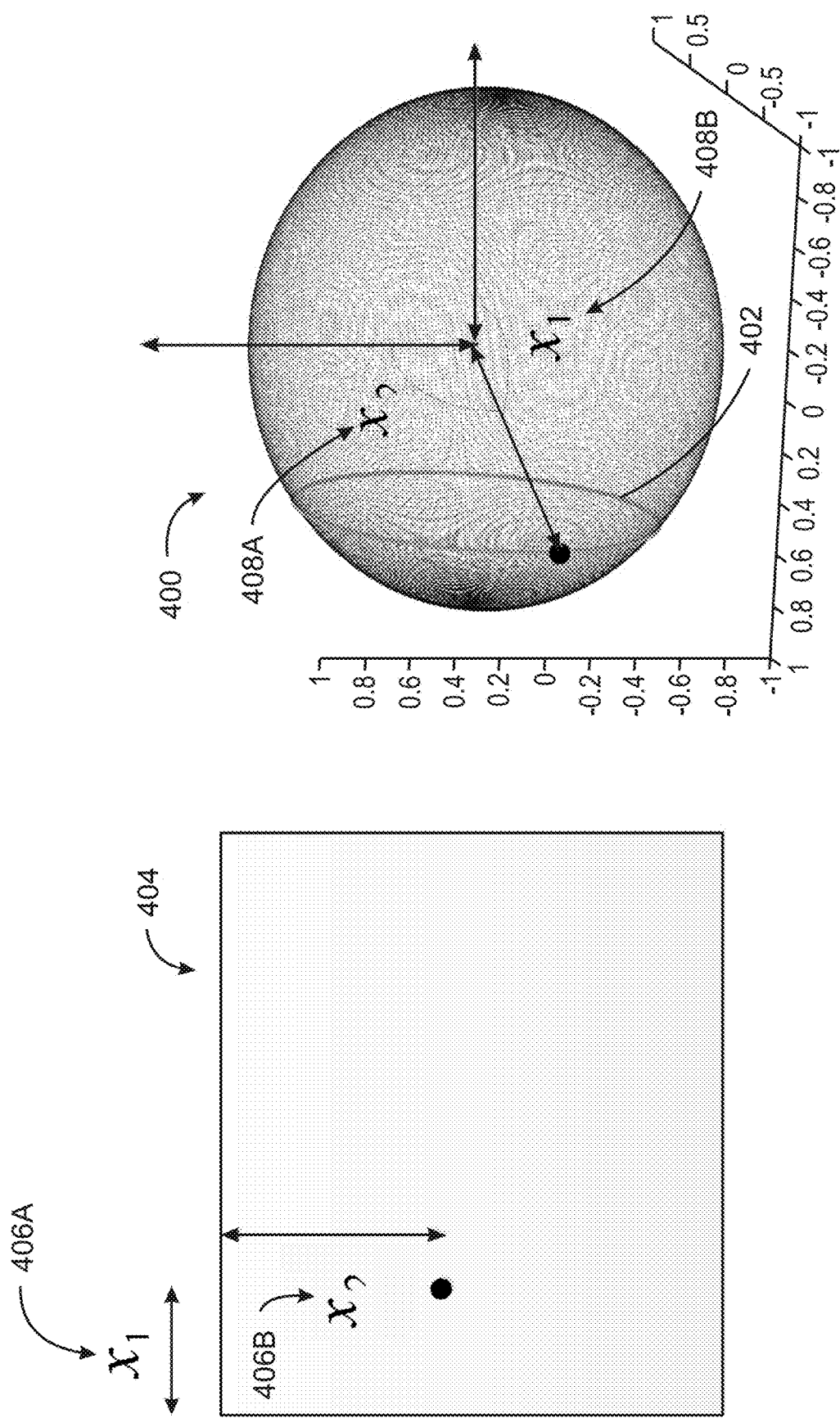
FIG. 4 is a unit sphere with parallel circles.

A CNN is based on a neural network that uses the convolution of filter banks to extract features. For the purposes of discussion, the present techniques are described as using a sphere as the 3D canvas for the convolution. However, any 3D shape can be used. FIG. 4 is a unit sphere 400 with parallel circles. The unit sphere 400 is used for the convolution. An exemplary plane image 404 is used for comparison purposed. In embodiments, a unit sphere 400 is generated with vertical slices that form circles. For example, circle 402 is one such circle. These parallel circles will contain the same number of pixels with a different density.

The parallel circles may ensure the same density by each circle being sampled with a same angle of separation, such as 1°, 2° etc. By using vertical slices with the same number of pixels, each circle for processing mimics a correspondence to pixels on the same plane if planes were used for convolution. Put another way, when pixels with 1° separation on the unit sphere are sampled, the convolution may be performed in a manner similar to convolution on a plane. In the plane image 404, there are two coordinates 406A and 406B for each pixel mapped to the unit sphere. When using a plane image 404 for convolution, the two coordinates 406A and 406B are used to determine a point on the plane. In the spherical case, the image on surface using two coordinates 408A and 408B (because of unit radius of circle) that correspond to the two angles x1 and x2. Put another way, in the case of convolution on a plane, the result of convolution will be an image on the plane. In the case of spherical convolution, the result is a filtered spherical image.

Figure 5:
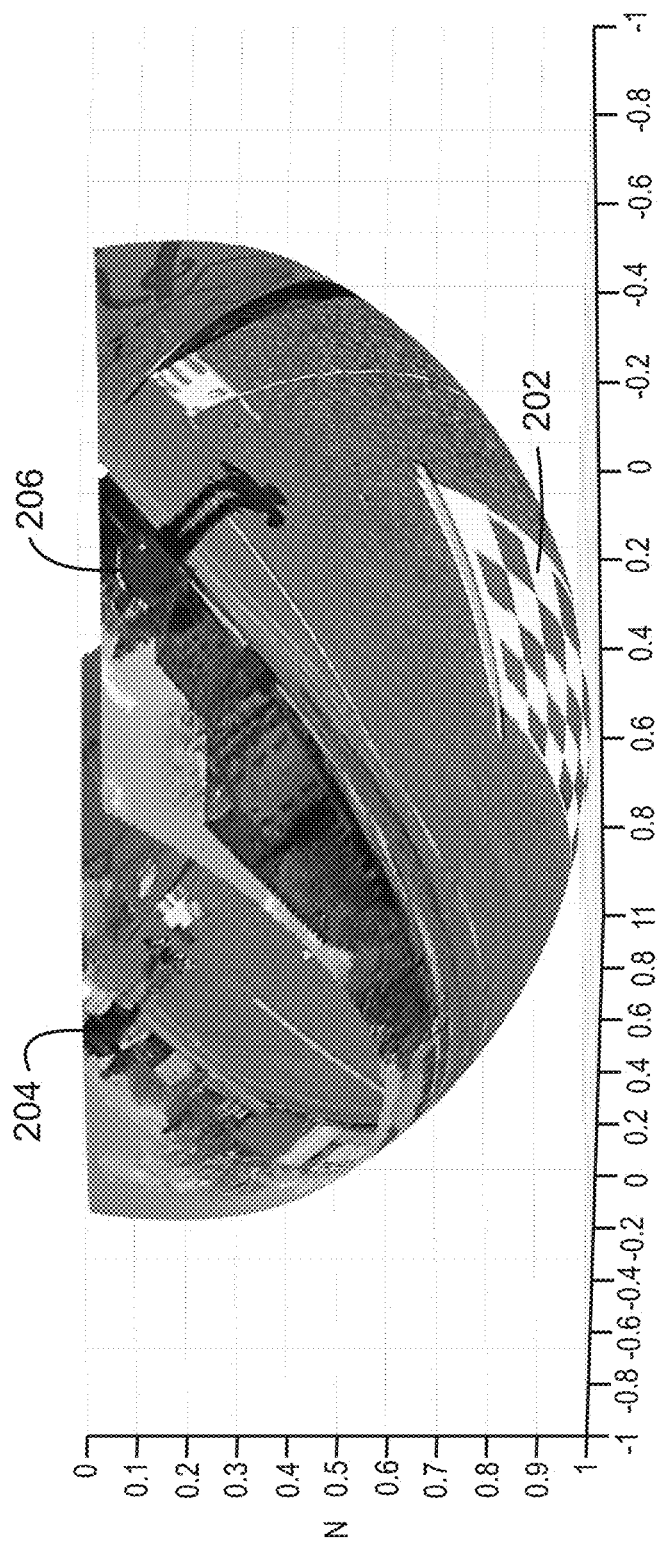
FIG. 5 is an illustration of the fisheye image projected on a unit sphere 500.

Using a spherical representation enables objects in the wide-angle image to keep their original shape, independent of their location to the camera. FIG. 5 is an illustration of the fisheye image projected on a unit sphere 500. The fisheye undistorted image given in 200A was projected on the sphere 400. Note that the person 204 and the person 206 are not distorted as shown in original fisheye images (FIG. 2).

Convolutions can now be implemented on the sphere 500 with two angles used as the convolution variables. In embodiments, each convolutional layer includes a number of filters or kernels which define the structure of the CNN. Convolution may be applied to the spherical unwrapped image. After the convolutional layers, a number of fully connected layers may be applied to the feature maps from the convolutional layers.

In embodiments, the convolution may be performed while representing the image using spherical harmonics, where spherical harmonics are functions defined on the surface of a sphere. Additionally, in embodiments, the convolution kernels or filters used in CNN may be given in a spherical domain as well. A filter operation in spherical harmonics domain is Linear Shift Invariant (LSI). The convolution applies to LSI operations. Accordingly, a spherical convolution enables the convolution necessary for CNN in spherical harmonics domain in very effective way. In embodiments, an LSI filter may be applied to the plane image, and the resulting image is again mapped to the sphere. In this case the resulting image on the sphere will not be LSI.

The image on the unit sphere can be parameterized by the spherical coordinates, where $S^2$ denotes the spherical coordinate system:

$$S^2 = \{\eta(\varphi, \vartheta)\} := \begin{pmatrix} \cos(\varphi)\sin(\varphi) \\ \sin(\varphi)\sin(\varphi) \\ \cos(\vartheta) \end{pmatrix}, \varphi \in [0, 2\pi), \vartheta \in [0, \pi)$$ Eqn. 5

The spherical harmonics create a complete orthogonal system of space of square integral functions on the sphere. In spherical coordinates the Spherical Harmonics are given as:

$$Y_{lm} = \sqrt{\frac{(+1)(l-m)!}{4\pi(l+m)}} P_l^m(\cos(\vartheta))e^{im\varphi}, l \in N \text{ and } |m| \leq l$$ Eqn. 6

The Spherical Harmonics depend on 2 indexes: l and m. Any function can be represented by using the Spherical Harmonics similar to the Fourier transformation. The direct and inverse spherical transformation are given below:

$$f = \Sigma_{l \in N} \Sigma_{|m| \leq l} SHT(f_{lm}) Y_{lm}, SHT(f_{lm}) = \Sigma_{l \in N} \Sigma_{|m| \leq l} \int f Y_{lm}^* d\eta \quad \text{Eqn. 7}$$

Where SHT is the spherical harmonics transform, and $d\eta$ is the surface element of the sphere given as $\sin(\vartheta)d\varepsilon\varphi$.

A spherical filter h is applied to the spherical image by the convolution:

$$(f*h) = \int f(\eta) h(g\eta) d\eta \quad \text{Eqn. 8}$$

With a rotational symmetric filter, it is enough to place h on each position of the sphere but the rotation of the filter (because of the symmetry) can be neglected. The filter that has rotational symmetry is applied because of the spherical operations, otherwise the results of the filtering will depend not only on the position of the filter function but rotation of the filter (kernel) on the particular location.

In this case the following is valid:

$$SHT(f*h)_{lm} = \sqrt{\frac{4\pi}{2l+1}} \cdot SHT(f_{lm}) \cdot SHT(h_{l0}) \quad \text{Eqn. 9}$$

This result is very similar to the classical convolution theorem.

It is important to note that on the right side of Eqn. 9 there is only $SHT(f_{l0})$. In particular, there is no sum with the higher components like $SHT(f_{l1})$, $SHT(f_{l2})$ etc. Those higher elements do not contribute at all, which makes the calculations less demanding. Thus, the left side which is convolution can be exchanged with the single multiplication from the right side.

A spherical Gaussian function can be introduced as:

$$SHT(G)_{lm} = \sqrt{\frac{2l+1}{4\pi}} \cdot e^{-l(l+1)t} \quad \text{Eqn. 10}$$

In CNN, various convolution kernels may be used, such as smoothing filters. In embodiments, the spherical Gaussian function is an exemplary smoothing filter. The convolution using Eqn. 9 guarantees the LSI of the filter and high speed of calculations.

Figure 6:
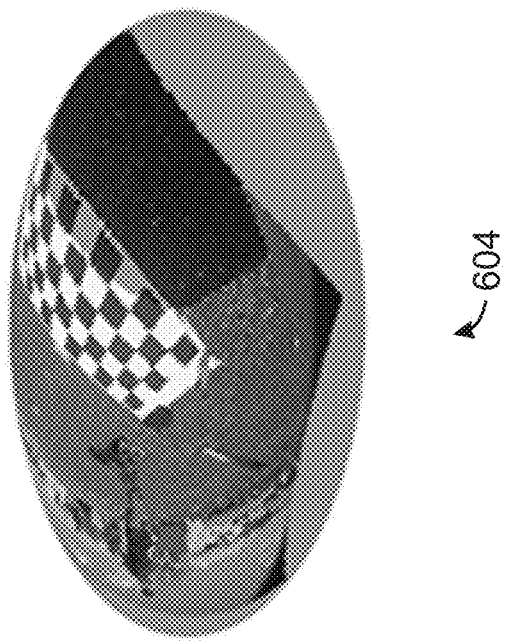
FIG. 6 is an illustration of the image unwrapped on the unit sphere via spherical harmonics.
Figure 6:
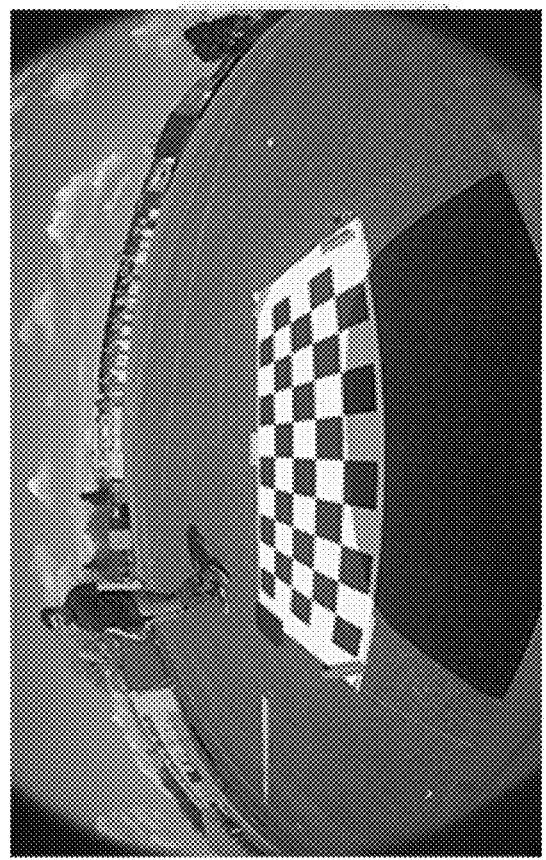

FIG. 6 is an illustration of an image 602 unwrapped on the unit sphere 602 via spherical harmonics. The image 602 is similar to the image 200A. The Spherical Gaussian filter was applied on the spherical image by using the spherical convolution of Eqn. 9. The Laplacian of Gaussian (LOG) of Spherical Gaussian is given as:

$$SHT(LoG)_{lm} = -l(l+1) \sqrt{\frac{2l+1}{4\pi}} \cdot e^{-l(l+1)t} \quad \text{Eqn. 11}$$

In embodiments, LOG types of filters are used in convolution layer of CNN. As an example we demonstrate how LOG filter can be applied to the spherical image.

Figure 7:
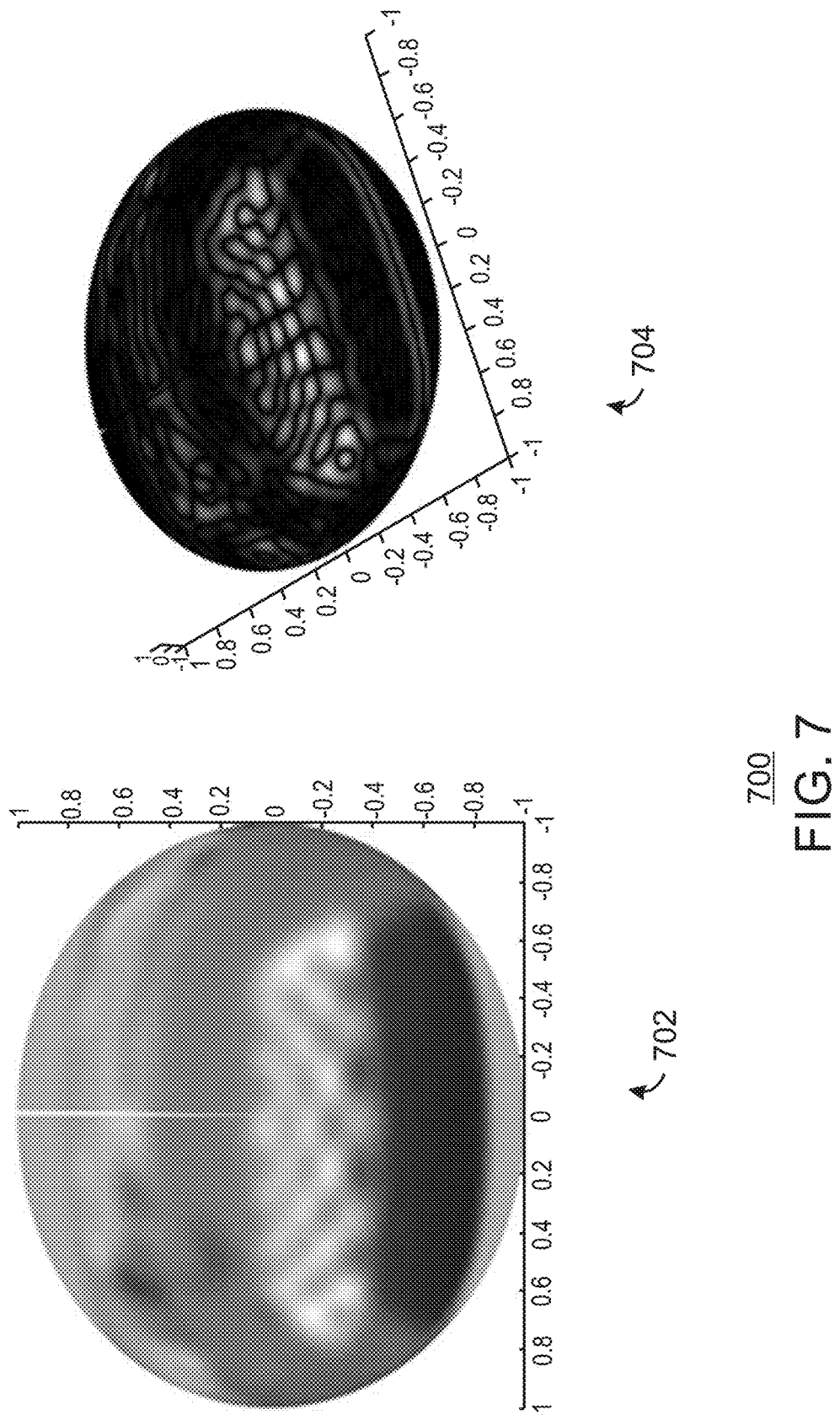
FIG. 7 is an illustration of filtering with spherical Gaussian and LOG.

FIG. 7 is an illustration of filtering with spherical Gaussian 702 and LOG 704. The results of LOG on the spherical image is given in at reference number 704. Accordingly, Eqn. 9 enables convolutions in the spherical coordinates for the different kernels. In embodiments, the output of the spherical convolution is used by the CNN algorithm for training.

Figure 8:
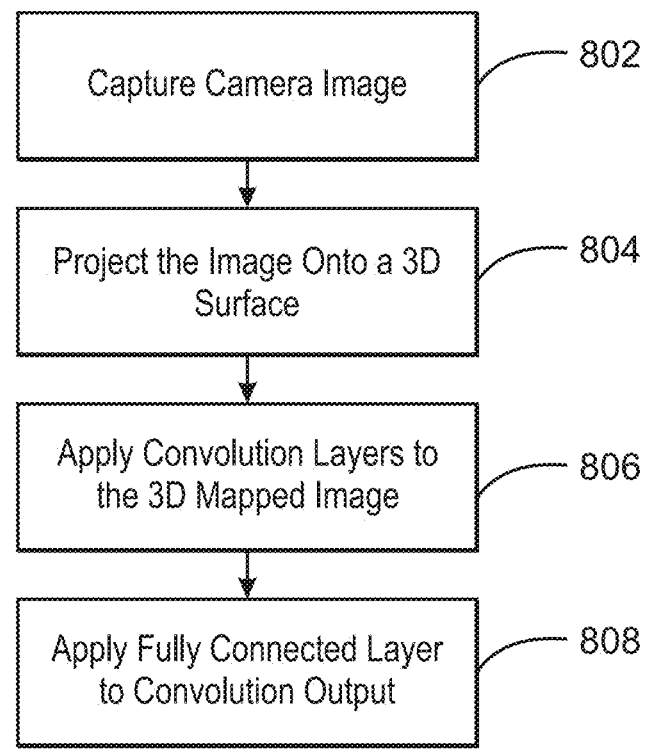
FIG. 8 is a process flow diagram of a method for applying a convolutional neural network (CNN) to a wide-angle camera image.

FIG. 8 is a process flow diagram of a method 800 for applying a convolutional neural network (CNN) to a wide-angle camera image. At block 802, a camera image may be captured. In embodiments, the camera image is a wide-angle camera image captured by a wide-angle camera. In embodiments, the camera may be a fisheye camera. At block 804, the wide-angle camera image may be projected onto a 3D surface. In embodiments, the 3D surface may be a sphere. At block 806, convolution layers are applied to the projected 3D image. In embodiments, the projected 3D image is represented by two convolution variables, where the two convolution variables are angles. At block 808, a fully connected layer is applied to the output of the convolution layers.

Figure 9:
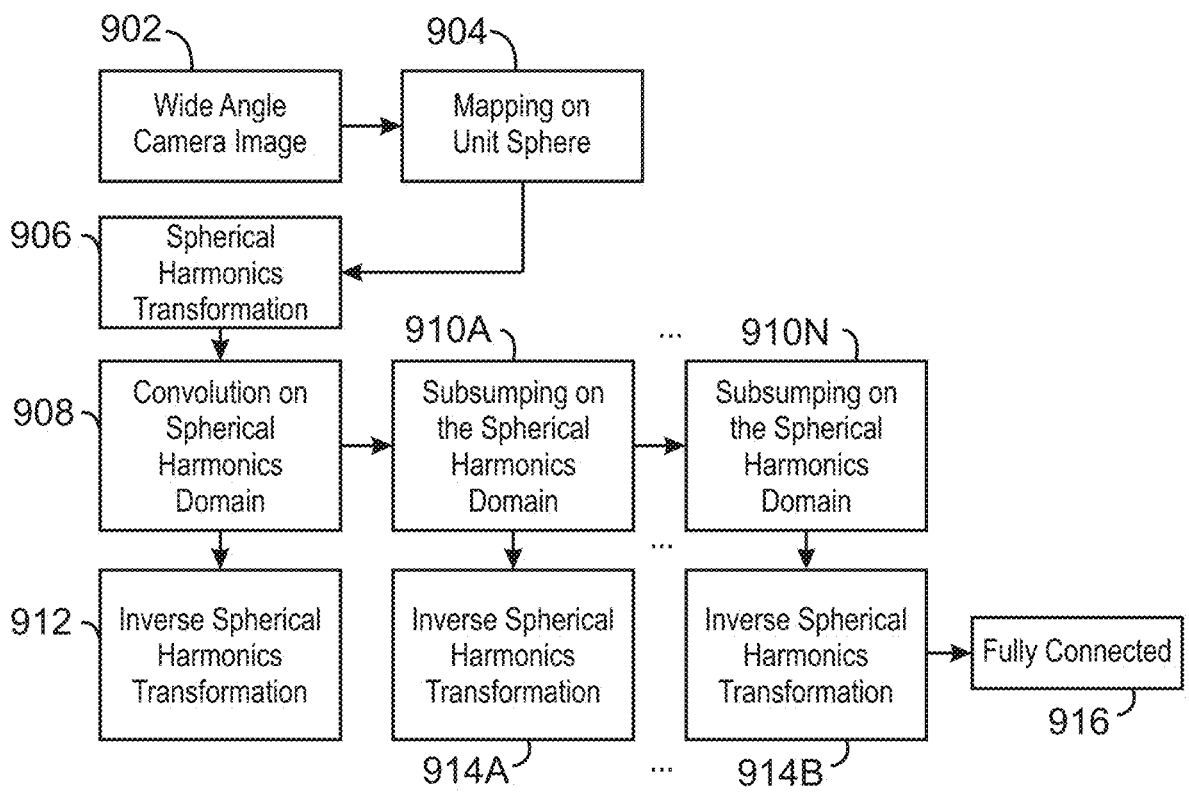
FIG. 9 is process flow diagram of a method for applying a convolutional neural network (CNN) to a wide-angle camera image using spherical harmonics.

FIG. 9 is process flow diagram of a method 900 for applying a convolutional neural network (CNN) to a wide-angle camera image using spherical harmonics. At block 902, a wide-angle camera image is captured. At block 904, the wide-angle camera image may be mapped onto a 3D surface, such as a unit sphere. At block 906, a spherical harmonics transformation is applied to the mapped image. For the spherical image, the spherical harmonic transformation is calculated. The spherical harmonics are calculated once and saved in memory. In embodiments, an LSI filter may be applied to the plane image, and the resulting image is again mapped to the sphere to ensure LSI operations during the spherical convolution. At block 908, convolution in the spherical harmonics domain is performed. Blocks 910A . . . 910N represent N convolutional layers used to perform the convolutions in the spherical domain. In embodiments, different filters or kernels are used for the convolution in the spherical harmonics domain. Thus, subsampling may be obtained in the spherical harmonics domain. At block 912, an inverse spherical harmonics transformation is applied to the convolved result. Blocks 914A . . . 914B represent N inverse transformations applied to each convolutional layer result. At block 916, a fully connected layer is applied to the convolutional layer results, which are features for training. In embodiments, the fully connected layer determines a number of classes used to classify a plurality of features.

In embodiments, just the convolution steps are adapted for application to a unit sphere through a pair of convolution variables or convolution in the spherical domain. In embodiments, the spherical transform can be calculated once and saved as lookup tables. The present techniques remove the perspective or wide-angle camera distortion, which reduces intra-class variation and improves the classification results.

Figure 10:
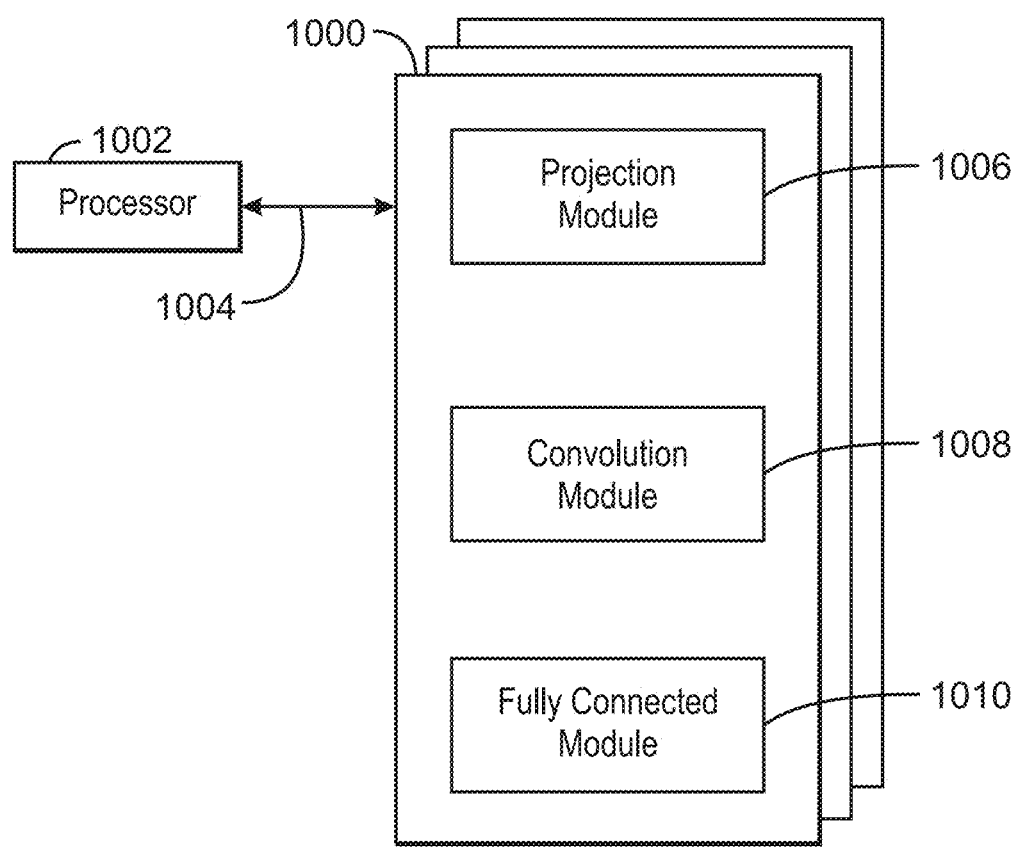
FIG. 10 is a block diagram showing a medium that contains logic for applying a convolutional neural network (CNN) to a wide-angle camera image.

FIG. 10 is a block diagram showing a medium 1000 that contains logic for applying a convolutional neural network (CNN) to a wide-angle camera image. The medium 1000 may be a computer-readable medium, including a non-transitory medium that stores code that can be accessed by a processor 1002 over a computer bus 1004. For example, the computer-readable medium 1000 can be volatile or non-volatile data storage device. The medium 1000 can also be a logic unit, such as an Application Specific Integrated Circuit (ASIC), a Field Programmable Gate Array (FPGA), or an arrangement of logic gates implemented in one or more integrated circuits, for example.

The medium 1000 may include modules 1006-1010 configured to perform the techniques described herein. For example, a projection module 1006 may be configured to project the wide-angle camera image onto a 3D surface. A convolution module 1008 may be configured to adapt convolution for application to a unit sphere through a pair of convolution variables or convolution in the spherical domain. A fully connected module 1010 may be configured to determine a number of classes used to classify a plurality of features. In some embodiments, the modules 1006-1010 may be modules of computer code configured to direct the operations of the processor 1002.

The block diagram of FIG. 10 is not intended to indicate that the medium 1000 is to include all of the components shown in FIG. 10. Further, the medium 1000 may include any number of additional components not shown in FIG. 10, depending on the details of the specific implementation.

Example 1 is an apparatus for applying a convolutional neural network (CNN) to a wide-angle camera image. The apparatus includes a camera, wherein the camera is to capture a wide-angle image; a controller to map the image onto a three dimensional (3D) surface; a convolution mechanism unit to perform convolution on the 3D surface; and a fully connected layer to classify a plurality of features generated by the convolution mechanism.

Example 2 includes the apparatus of example 1, including or excluding optional features. In this example, the 3D surface is a sphere.

Example 3 includes the apparatus of any one of examples 1 to 2, including or excluding optional features. In this example, mapping the wide-angle image onto the 3D surface comprises multiplying a projection matrix to each real-world coordinate point from the wide-angle image.

Example 4 includes the apparatus of any one of examples 1 to 3, including or excluding optional features. In this example, intrinsic parameters from the camera are used to map the image onto the 3D surface, wherein the intrinsic parameters comprise polynomial coefficients, camera centers, camera resolution, or any combination thereof.

Example 5 includes the apparatus of any one of examples 1 to 4, including or excluding optional features. In this example, a spherical harmonics transformation is applied to the mapped image and convolution performed in a spherical harmonics domain. Optionally, an inverse spherical harmonics transformation is applied to a result of convolution in the spherical harmonics domain. Optionally, an LSI filter may be applied to a plane image derived from the mapped image, and an LSI filter result is mapped to a 3D surface. Optionally, the spherical harmonics transformation is stored as a lookup table.

Example 6 includes the apparatus of any one of examples 1 to 5, including or excluding optional features. In this example, the fully connected layer is to determine a number of classes used to classify a plurality of features.

Example 7 includes the apparatus of any one of examples 1 to 6, including or excluding optional features. In this example, a polynomial approximation of the camera is used to map the image on the 3D surface.

Example 8 is a method for applying a convolutional neural network (CNN) to a wide-angle camera image. The method includes capturing a wide-angle image; projecting the wide-angle image onto a unit sphere; convolving the projected image via a plurality of convolution layers; and classifying a plurality of features extracted by the convolution layers.

Example 9 includes the method of example 8, including or excluding optional features. In this example, the wide angle image is represented using spherical harmonics and the convolution is performed using the spherical harmonics.

Example 10 includes the method of any one of examples 8 to 9, including or excluding optional features. In this example, the plurality of convolution layers comprise convolution kernels in a spherical domain.

Example 11 includes the method of any one of examples 8 to 10, including or excluding optional features. In this example, at least one layer of the plurality of convolution layers comprises a linear shift invariant filter.

Example 12 includes the method of any one of examples 8 to 11, including or excluding optional features. In this example, at least one layer of the plurality of convolution layers comprises a rotational symmetric filter.

Example 13 includes the method of any one of examples 8 to 12, including or excluding optional features. In this example, at least one layer of the plurality of convolution layers comprises a spherical Gaussian function.

Example 14 includes the method of any one of examples 8 to 13, including or excluding optional features. In this example, projecting the wide-angle image onto the sphere comprises multiplying a projection matrix to each real-world coordinate point from the wide-angle image.

Example 15 includes the method of any one of examples 8 to 14, including or excluding optional features. In this example, intrinsic parameters from a camera are used to project the image onto the sphere, wherein the intrinsic parameters comprise polynomial coefficients, camera centers, camera resolution, or any combination thereof.

Example 16 includes the method of any one of examples 8 to 15, including or excluding optional features. In this example, an inverse spherical harmonics transformation is applied to a result of convolution in the spherical harmonics domain before classifying the plurality features.

Example 17 includes the method of any one of examples 8 to 16, including or excluding optional features. In this example, a fully connected layer of the CNN is used to determine a number of classes used to classify the plurality of features.

Example 18 includes the method of any one of examples 8 to 17, including or excluding optional features. In this example, a polynomial approximation of a distortion of the wide-angle camera image is used to map the image onto the sphere.

Example 19 is a system for applying a convolutional neural network (CNN) to a wide-angle camera image. The system includes a camera configured to capture wide-angle images; a memory that is to store instructions and that is communicatively coupled to the camera; and a processor communicatively coupled to the camera and the memory, wherein when the processor is to execute the instructions, the processor is to: project the wide-angle image onto a unit sphere; convolve the projected image via a plurality of convolution layers in a spherical domain; and classify a plurality of features extracted by the convolution layers.

Example 20 includes the system of example 19, including or excluding optional features. In this example, the wide angle image is represented using spherical harmonics and the convolution is performed using the spherical harmonics.

Example 21 includes the system of any one of examples 19 to 20, including or excluding optional features. In this example, a polynomial approximation of a distortion of the wide-angle camera image is used to map the image onto the sphere.

Example 22 includes the system of any one of examples 19 to 21, including or excluding optional features. In this example, at least one layer of the plurality of convolution layers comprises a linear shift invariant filter.

Example 23 includes the system of any one of examples 19 to 22, including or excluding optional features. In this example, at least one layer of the plurality of convolution layers comprises a rotational symmetric filter.

Example 24 includes the system of any one of examples 19 to 23, including or excluding optional features. In this example, at least one layer of the plurality of convolution layers comprises a spherical Gaussian function.

Example 25 includes the system of any one of examples 19 to 24, including or excluding optional features. In this example, projecting the wide-angle image onto the sphere comprises multiplying a projection matrix to each real-world coordinate point from the wide-angle image.

Example 26 includes the system of any one of examples 19 to 25, including or excluding optional features. In this example, intrinsic parameters from a camera are used to project the image onto the sphere, wherein the intrinsic parameters comprise polynomial coefficients, camera centers, camera resolution, or any combination thereof.

Example 27 includes the system of any one of examples 19 to 26, including or excluding optional features. In this example, an inverse spherical harmonics transformation is applied to a result of convolution in the spherical harmonics domain before classifying the plurality features.

Example 28 includes the system of any one of examples 19 to 27, including or excluding optional features. In this example, a fully connected layer of the CNN is used to determine a number of classes used to classify the plurality of features.

Example 29 is a tangible, non-transitory, computer-readable medium. The computer-readable medium includes instructions that direct the processor to obtain a wide-angle image; project the wide-angle image onto a unit sphere; convolve the projected image via a plurality of convolution layers; and classify a plurality of features extracted by the convolution layers.

Example 30 includes the computer-readable medium of example 29, including or excluding optional features. In this example, the wide angle image is represented using spherical harmonics and the convolution is performed using the spherical harmonics.

Example 31 includes the computer-readable medium of any one of examples 29 to 30, including or excluding optional features. In this example, the plurality of convolution layers comprise convolution kernels in a spherical domain.

Example 32 includes the computer-readable medium of any one of examples 29 to 31, including or excluding optional features. In this example, at least one layer of the plurality of convolution layers comprises a linear shift invariant filter.

Example 33 includes the computer-readable medium of any one of examples 29 to 32, including or excluding optional features. In this example, at least one layer of the plurality of convolution layers comprises a rotational symmetric filter.

Example 34 includes the computer-readable medium of any one of examples 29 to 33, including or excluding optional features. In this example, at least one layer of the plurality of convolution layers comprises a spherical Gaussian function.

Example 35 includes the computer-readable medium of any one of examples 29 to 34, including or excluding optional features. In this example, projecting the wide-angle image onto the sphere comprises multiplying a projection matrix to each real-world coordinate point from the wide-angle image.

Example 36 includes the computer-readable medium of any one of examples 29 to 35, including or excluding optional features. In this example, intrinsic parameters from a camera are used to project the image onto the sphere, wherein the intrinsic parameters comprise polynomial coefficients, camera centers, camera resolution, or any combination thereof.

Example 37 includes the computer-readable medium of any one of examples 29 to 36, including or excluding optional features. In this example, an inverse spherical harmonics transformation is applied to a result of convolution in the spherical harmonics domain before classifying the plurality features.

Example 38 includes the computer-readable medium of any one of examples 29 to 37, including or excluding optional features. In this example, a fully connected layer of the CNN is used to determine a number of classes used to classify the plurality of features.

Example 39 includes the computer-readable medium of any one of examples 29 to 38, including or excluding optional features. In this example, a polynomial approximation of a distortion of the wide-angle camera image is used to map the image onto the sphere.

Example 40 is an apparatus for applying a convolutional neural network (CNN) to a wide-angle camera image. The apparatus includes instructions that direct the processor to a camera, wherein the camera is to capture a wide-angle image; a means to map the image onto a three dimensional (3D) surface; a means to perform convolution on the 3D surface; and a means to classify a plurality of features generated by the convolution mechanism.

Example 41 includes the apparatus of example 40, including or excluding optional features. In this example, the 3D surface is a sphere Example 42 includes the apparatus of any one of examples 40 to 41, including or excluding optional features. In this example, mapping the wide-angle image onto the 3D surface comprises multiplying a projection matrix to each real-world coordinate point from the wide-angle image.

Example 43 includes the apparatus of any one of examples 40 to 42, including or excluding optional features. In this example, intrinsic parameters from the camera are used to map the image onto the 3D surface, wherein the intrinsic parameters comprise polynomial coefficients, camera centers, camera resolution, or any combination thereof.

Example 44 includes the apparatus of any one of examples 40 to 43, including or excluding optional features. In this example, a spherical harmonics transformation is applied to the mapped image and convolution performed in a spherical harmonics domain. Optionally, an inverse spherical harmonics transformation is applied to a result of convolution in the spherical harmonics domain. Optionally, an LSI filter may be applied to a plane image derived from the mapped image, and an LSI filter result is mapped to a 3D surface. Optionally, the spherical harmonics transformation is stored as a lookup table.

Example 45 includes the apparatus of any one of examples 40 to 44, including or excluding optional features. In this example, the fully connected layer is to determine a number of classes used to classify a plurality of features.

Example 46 includes the apparatus of any one of examples 40 to 45, including or excluding optional features. In this example, a polynomial approximation of the camera is used to map the image on the 3D surface.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for applying a convolutional neural network (CNN) to a wide-angle camera image, comprising:
    a camera, wherein the camera is to capture a wide-angle image;
    a controller to project the wide-angle image onto a three dimensional (3D) surface to obtain an unwrapped image;
    a convolution mechanism to perform convolution on the unwrapped image via at least one filter to generate a plurality of features, wherein the wide-angle image projected onto the 3D surface is sampled at a plurality of slices with a same angle of separation; and
    a fully connected layer of the CNN to classify the plurality of features generated by the convolution mechanism.

2. The apparatus of claim 1, wherein the 3D surface is a sphere.

3. The apparatus of claim 1, wherein projecting the wide-angle image onto the 3D surface comprises multiplying a projection matrix to each real-world coordinate point from the wide-angle image.

4. The apparatus of claim 1, wherein intrinsic parameters from the camera are used to map the image onto the 3D surface, wherein the intrinsic parameters comprise polynomial coefficients, camera centers, camera resolution, or any combination thereof.

5. The apparatus of claim 1, wherein a spherical harmonics transformation is applied to the unwrapped image and convolution is performed in a spherical harmonics domain.

6. The apparatus of claim 1, wherein the fully connected layer is to determine a number of classes used to classify a plurality of features.

7. The apparatus of claim 1, wherein a polynomial approximation of the camera is used to map the image on the 3D surface.

8. A method for applying a convolutional neural network (CNN) to a wide-angle camera image, comprising:
    capturing a wide-angle image;
    projecting the wide-angle image onto a unit sphere to obtain an unwrapped image;
    convolving the unwrapped image via a plurality of convolution layers to generate a plurality of features, wherein the wide-angle image projected onto the unit sphere is sampled at a plurality of slices of the unit sphere with a same angle of separation; and
    classifying the plurality of features extracted by the convolution layers.

9. The method of claim 8, wherein the wide angle image is represented using spherical harmonics and the convolution is performed using the spherical harmonics.

10. The method of claim 8, wherein the plurality of convolution layers comprises convolution kernels in a spherical domain.

11. The method of claim 8, wherein at least one layer of the plurality of convolution layers comprises a linear shift invariant filter.

12. The method of claim 8, wherein at least one layer of the plurality of convolution layers comprises a rotational symmetric filter.

13. The method of claim 8, wherein at least one layer of the plurality of convolution layers comprises a spherical Gaussian function.

14. A system for applying a convolutional neural network (CNN) to a wide-angle camera image, comprising
    a camera configured to capture a wide-angle image;
    a memory that is to store instructions and that is communicatively coupled to the camera; and
    a processor communicatively coupled to the camera and the memory, wherein when the processor is to execute the instructions, the processor is to:
    project the wide-angle image onto a unit sphere to obtain an unwrapped image;
    convolve the unwrapped image via a plurality of convolution layers in a spherical domain to generate a plurality of features, wherein the wide-angle image projected onto the unit sphere is sampled at a plurality of slices of the unit sphere with a same angle of separation; and
    classify the plurality of features extracted by the convolution layers.

15. The system of claim 14, wherein the wide angle image is represented using spherical harmonics and the convolution is performed using the spherical harmonics.

16. The system of claim 14, wherein a polynomial approximation of a distortion of the wide-angle camera image is used to project the image onto the sphere.

17. The system of claim 14, wherein at least one layer of the plurality of convolution layers comprises a linear shift invariant filter.

18. The system of claim 14, wherein projecting the wide-angle image onto the sphere comprises multiplying a projection matrix to each real-world coordinate point from the wide-angle image.

19. The system of claim 14, wherein intrinsic parameters from a camera are used to project the image onto the sphere, wherein the intrinsic parameters comprise polynomial coefficients, camera centers, camera resolution, or any combination thereof.

20. The system of claim 14, wherein an inverse spherical harmonics transformation is applied to a result of convolution in the spherical harmonics domain before classifying the plurality features.

21. The system of claim 14, wherein a fully connected layer of the CNN is used to determine a number of classes used to classify the plurality of features.

22. A tangible, non-transitory, computer-readable medium comprising instructions that, when executed by a processor, direct the processor to:
   obtain a wide-angle image;
   project the wide-angle image onto a unit sphere to obtain an unwrapped image;
   convolve the unwrapped image via a plurality of convolution layers to generate a plurality of features, wherein the wide-angle image projected onto the unit sphere is sampled at a plurality of slices of the unit sphere with a same angle of separation; and
   classify the plurality of features extracted by the convolution layers.

23. The computer readable medium of claim 22, wherein the wide angle image is represented using spherical harmonics and the convolution is performed using the spherical harmonics.

24. The computer readable medium of claim 22, wherein the plurality of convolution layers comprises convolution kernels in a spherical domain.

25. The computer readable medium of claim 22, wherein at least one layer of the plurality of convolution layers comprises a linear shift invariant filter.

* * * * *